UNITED STATES PATENT OFFICE.

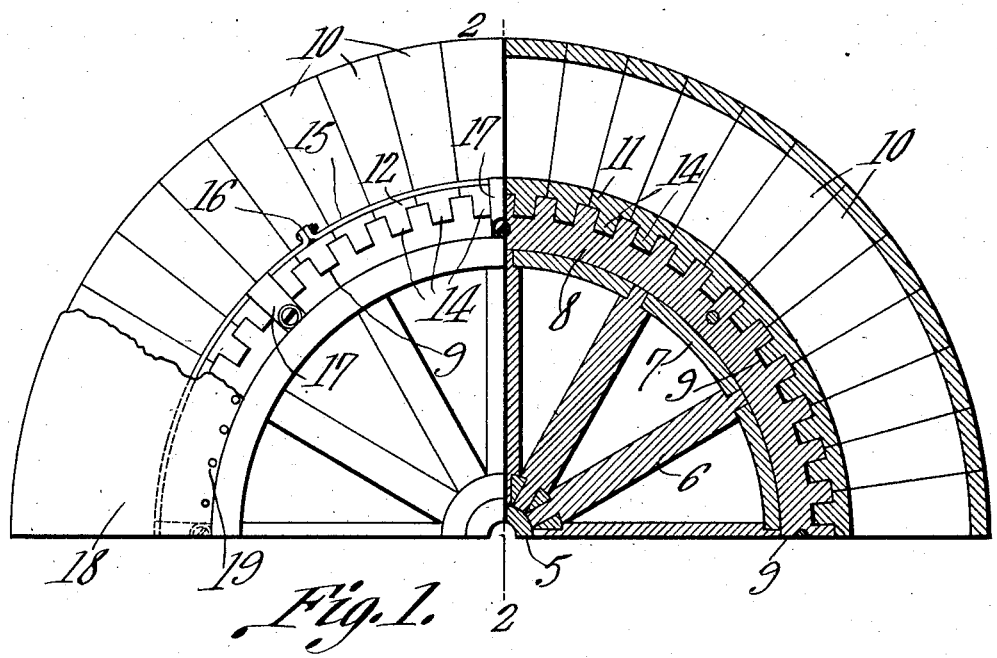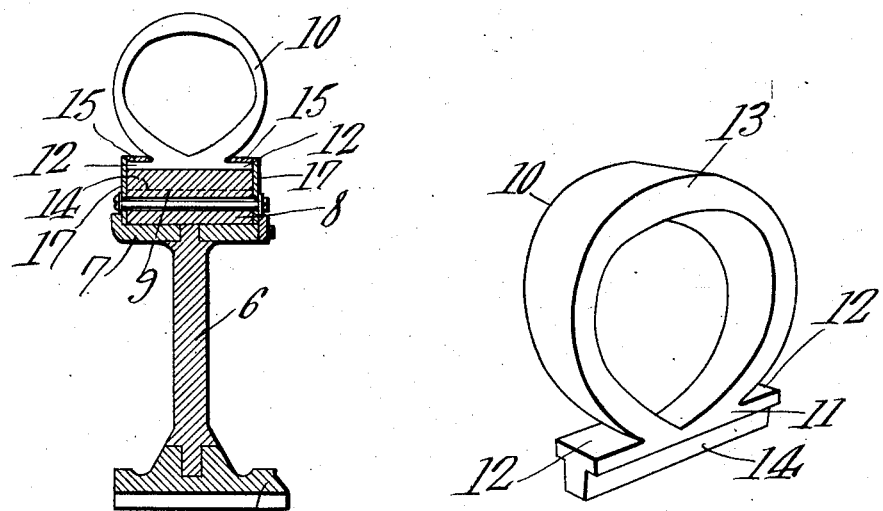

FRANK VITALI, OF HEALDSBURG, CALIFORNIA.

WHEEL-TIRE.

1,010,539.　　　　Specification of Letters Patent.　　Patented Dec. 5, 1911.

Application filed March 6, 1911. Serial No. 612,611.

*To all whom it may concern:*

Be it known that I, FRANK VITALI, a citizen of the United States, residing at Healdsburg, in the county of Sonoma and State of California, have invented a new and useful Wheel-Tire, of which the following is a specification.

It is the object of the present invention to provide an improved tire for vehicle wheels, the tire being designed to take the place of the ordinary pneumatic tire and being so constructed that it may be readily applied to the ordinary wheel rim adapted for the support of a tire device.

One aim of the invention is to provide a tire which will not present the disadvantage of being liable to puncture and which will include in its structure, a plurality of segments which may be selectively removed from the body or base of the tire and replaced. These segments are of spring steel and consequently will yield in the same manner as an ordinary pneumatic tire, they being in cross section of substantially the same contour as such a tire.

As stated, the invention contemplates that the tire shall be applicable to the rim of a wheel arranged to carry an ordinary pneumatic tire and consequently the application of the tire of the present invention to a vehicle wheel will not render necessary any change in the structure of the wheel.

In the accompanying drawings—Figure 1 is a view partly in elevation and partly in section of a vehicle wheel carrying a tire constructed in accordance with the present invention. Fig. 2 is a vertical transverse sectional view on the line 2—2 of Fig. 1. Fig. 3 is a perspective view in detail of one of the cushion segments of the tire.

In the drawings, there is illustrated an ordinary wheel such as is used upon automobiles, the hub of the wheel being indicated by the numeral 5, the spokes by the numeral 6 and the rim by the numeral 7, the rim being of that type known as a clencher rim.

The tire embodying the present invention includes in its structure, an integral annular base 8 which is of the proper diameter to fit snugly upon the clencher rim 7 between the flanges thereof and is designed to be held upon the rim by these flanges in the same manner as an ordinary rubber tire is held. In its outer surface, the annular base 8 is formed with a circumferential series of sockets in the nature of transversely extending grooves 9. These grooves 9 extend entirely across the base 8.

The tire proper is made up of a plurality of cushion segments which are preferably of spring steel and substantially circular in cross section in their body portion, the said body portion being indicated by the numeral 10. Each section has its body 10 formed with a base portion 11 which at its ends projects beyond the body whereby to form lateral shoulders 12. The base portion 11 is of a width from front to rear the same as the length of the body of the segment at the base thereof so that the ends of the body will be in plane coincident with the front and rear edges of the base portions. Inasmuch as the segments are assembled end to end about the rim of the wheel, their said ends will lie in plane radiating from the axis of the wheel. Also, while the segments are preferably accurately fitted end to end, they are not connected in this relation and may yield independently as the wheel travels over the ground. Preferably, the treads of the segments are thickened as indicated by the numeral 13. Each base portion 11 is formed upon its underside with a transversely extending tongue 14 and the tongues of the several segments provided, are inserted into the seats or grooves 9 in the annular base 8 of the tire in the manner illustrated clearly in Fig. 1 of the drawings. These tongues are of a length equal to the width of the base portion of the segments and are of a thickness less than the width of the said base portion. In order to hold the segments in assembled relation about the base 8, there are provided split bands 15 which are fitted around the shoulder 12 of the segments at each side thereof and clamped in place at their ends as at 16. These bands serve to firmly clamp the segments to the base and also serve to prevent relative lateral displacement of the segments. In order to hold the segments as a series against displacement, there are provided a plurality of clips 17 secured to the base 8 and projecting outwardly radially from their point of attachment and abutting against two or more of the segment bases, at their ends. To protect the metal segments from the elements and to render the wheel as nearly noiseless as is practical, a covering or sheath 18 is fitted over the entire number of segments and secured at its edges as at 19 to the sides of the annular base 8.

From the foregoing description of the invention it will be readily understood that there is provided a wheel tire made up of a plurality of resilient segments which are interchangeable and readily replaceable selectively.

What is claimed is:

A wheel tire comprising an annular base formed with a circumferential series of radial sockets, a plurality of separate cushion segments formed each with a transverse tongue and lateral shoulders, the tongues fitting in the sockets, means engaging with the shoulders for holding the segments in position, and an outer tube surrounding and held distended at all points by said segments.

In testimony that I claim the foregoing as my own, I have hereto affixed my signature in the presence of two witnesses.

FRANK VITALI.

Witnesses:
GEORGE F. DAY,
EDWARD H. GUILLIE.

Copies of this patent may be obtained for five cents each, by addressing the "Commissioner of Patents, Washington, D. C."